(No Model.) 2 Sheets—Sheet 1.
J. R. COX.
CORN PLANTER.
No. 464,010. Patented Dec. 1, 1891.
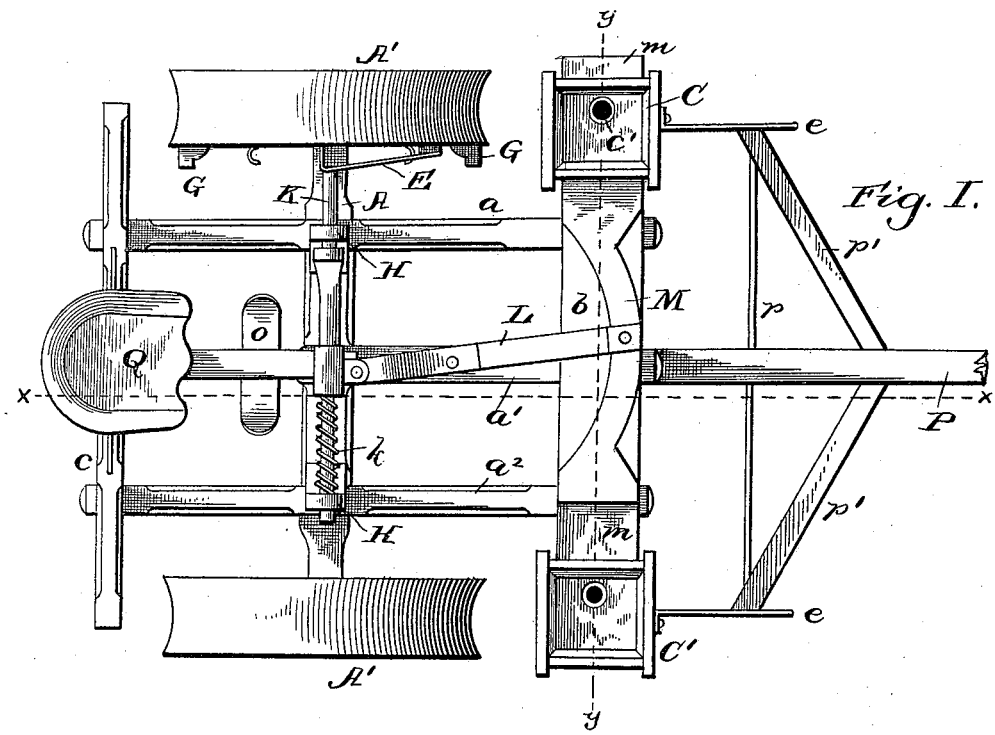
Fig. I.
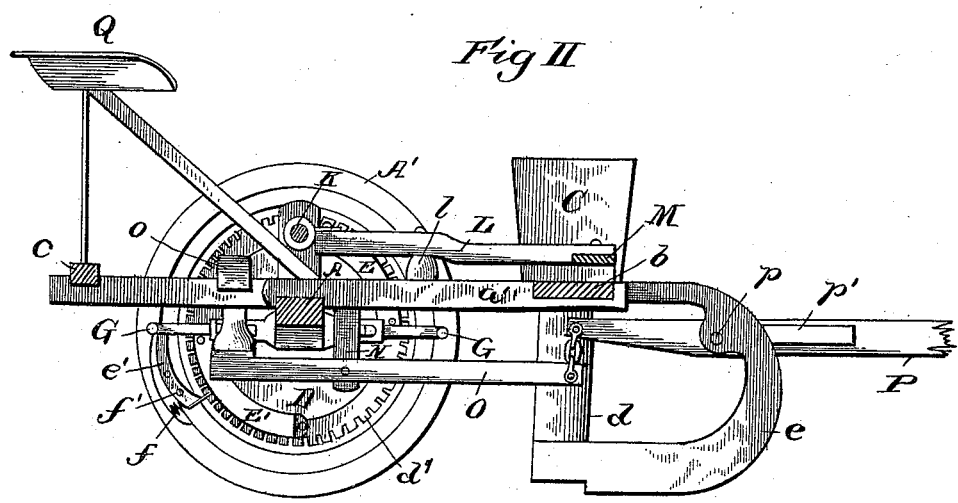
Fig II.
Witnesses:
J. B. McGirr.
Arthur L. Bryant
Inventor:
Jacob R. Cox
By his Attorneys,
Edson Bros.

(No Model.)
2 Sheets—Sheet 2.
J. R. COX.
CORN PLANTER.
No. 464,010. Patented Dec. 1, 1891.
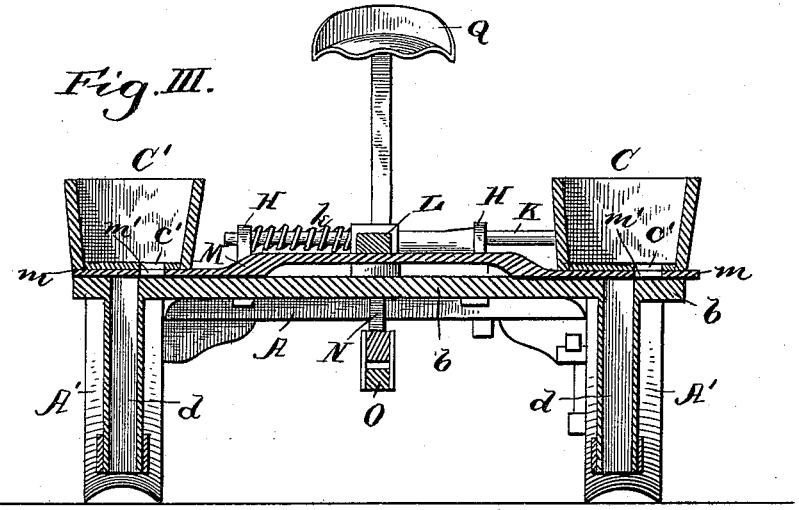
Fig. III.
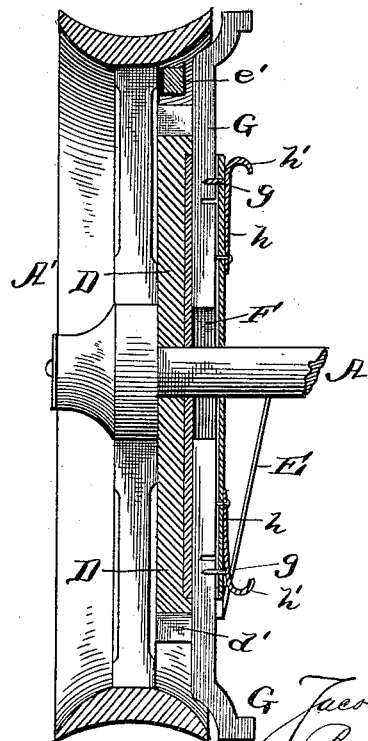
Fig. IV.
Witnesses:
J. B. McGirr.
Arthur L. Bryant.
Inventor:
Jacob R. Cox
By his Attorneys
Edson Bros.

UNITED STATES PATENT OFFICE.

JACOB RINEARSON COX, OF CLAYTON, INDIANA.

CORN-PLANTER.

SPECIFICATION forming part of Letters Patent No. 464,010, dated December 1, 1891.

Application filed April 23, 1891. Serial No. 390,164. (No model.)

*To all whom it may concern:*

Be it known that I, JACOB RINEARSON COX, a citizen of the United States, residing at Clayton, in the county of Hendricks and State of Indiana, have invented certain new and useful Improvements in Corn-Planters; and I do hereby declare the following to be a full, clear, and exact description of the invention, such as will enable others skilled in the art to which it appertains to make and use the same.

My invention relates to improvements in corn-planters; and the objects are, first, to provide a simple and effective machine for planting corn at certain regular intervals or distances, and, second, to provide a simple means for raising or lifting the feed-boxes and means associated therewith to raise the depending tubes out of contact with the ground when the machine is being moved from place to place.

With these and other ends in view my invention consists of the peculiar construction and arrangement of parts and combination of devices, as will be fully pointed out hereinafter.

To enable others to more readily understand my invention, I have illustrated the same in the accompanying drawings, in which—

Figure I is a plan view of a corn-planter constructed in accordance with my invention. Fig. II is a longitudinal sectional view on the line $x\ x$ of Fig. I. Fig. III is a transverse sectional view on the line $y\ y$ of Fig. I. Fig. IV is a sectional view through the carrying-wheel to which the marking mechanism is secured.

Like letters of reference denote corresponding parts in the several figures of the drawings, referring to which—

A designates the axle of my machine, on the ends of which are secured the wheels A'. Supported on the axle A is a main frame, consisting of the parallel bars $a\ a'\ a''$, which are all connected at their forward ends by a cross-bar $b$, and $a\ a''$ are connected at their rear ends by a cross-bar $c$, while the other central bar $a'$ extends only from the axle A to the front cross-bar $b$. Supported on the cross-bar $b$ at points at or near its ends are grain boxes or hoppers C C', the bottom of each of which boxes is provided with an opening or aperture $c'$. To the under side of the cross-bar $b$, near the ends thereof and directly in advance of the carrying-wheels A', are connected discharge conduits or tubes $d$, the lower ends of which are raised a short distance above the ground, and from the lower ends of these tubes to the front of the feed-boxes extend curved runners $e$.

Secured on the axle A, close to one of the wheels A', is a disk or plate D, the periphery of which is provided with a series of notches or teeth $d'$, with which is adapted to engage one end of a pawl $e'$, which is pivoted on the inner side of the rim of the wheel A'. Said pawl is kept in engagement with the notched or toothed periphery of the plate D by means of a short coiled spring $f$, fitted around a suitable stud and extending from the top of the pawl to the under surface of the rim of the wheel. The pawl is also provided with a projecting stud or handle $f'$, by means of which the other end of said pawl can be lifted out of engagement with the toothed periphery of the plate D to disengage the same from the carrying-wheel A'. When thus disengaged the pawl is kept out of engagement by any suitable means. On the inner face of the plate D are also attached, at diametrically-opposite points, two inclined cam-shaped projections E E', which may either be made solid or, as shown in the drawings, consist of metallic plates bent into the proper shape and secured at the ends to the plate D. The plate D also has attached thereto sockets or keepers F, in which are fitted the shanks of the markers G. These markers G are held in position in the sockets F by means of pins or studs $g$, carried by spring-arms $h$, secured to the outer side of said sockets, and said pins extend through the wall of said sockets and fit in apertures formed in the markers G. It will thus be seen that the markers G can be adjusted in said sockets so as to project more or less beyond the rim of the carrying-wheel A' by simply placing the pin or stud in the proper aperture. The spring-arms $h$ are provided at their outer ends with a handle or thumb-piece $h'$, by means of which the pins can be readily removed from or inserted in the desired aperture in the markers G.

Supported in uprights or standards H on the axle A is an endwise-movable rod K, one end of which extends through one of the standards H and is adapted to contact with the stops E E' as the carrying-wheel and the plate D are rotated. Fitted around the rod K, between one of the standards and an enlarged collar on said rod, is a coiled spring $k$, which serves to return the rod to its normal position after it has been moved or forced in the direction of its length by contact with one of the cams on the plate D. To the collar of this rod K is attached one end of a lever L, which is pivoted or fulcrumed on a suitable block $l$, fixed to the bar $a'$ of the machine. The forward end of the lever L is attached to a horizontal feed-slide M, and said slide is provided at either end with a plate $m$, which extends over the cross-bar $b$ of the main frame below the bottom of the hoppers carried by said cross-bar. The plates $m$ are each provided with an opening or aperture $m'$.

Secured to the lower side of the bar $a'$ of the main frame, slightly in advance of the axle A, is a downwardly-extending arm N, and on said arm is fulcrumed a lever O, which is provided at its rear end with a foot-rest $o$ and is connected at its forward end by means of two clevises and a link, or in any other suitable manner, with the rear end of the tongue P of the machine. The tongue P is connected with the runners $e$ by means of a cross-rod $p$ and braces $p'$.

Over the rear end of the machine is suitably supported a seat Q, so arranged that the driver's feet can rest on the foot-rest $o$.

The rims of the carrying-wheels are preferably made slightly concave in cross-section, as shown in Fig. IV of the drawings.

The operation of my invention may be briefly stated as follows: The plate D being connected with the carrying-wheel A' by the spring-controlled pawl, every time the cam-shaped projections come in contact with the end of the rod K the latter is moved endwise by such contact. As soon as the cam projection passes the end of the rod K' the coiled spring $k$ returns said rod to its normal position, and this reciprocating movement of the rod K is communicated to the feed-slide M and causes the aperture $m'$ in the plates $m$ to alternately align with the openings in the grain boxes or hoppers and with the discharge tubes or conduits to deliver grain from the box to openings made in the ground by the runners $e$. The dish-shaped carrying-wheels, which, as before stated, are directly in rear of the planting mechanism, operate to cover the grain. When it is desired to remove the machine to another field or place, the plate D and carrying-wheel A' are disengaged, and by depressing the foot-support the driver can raise the forward portion of the machine above the ground.

I am aware that changes in the form and proportion of parts and details of construction of the devices herein shown and described as an embodiment of my invention can be made without departing from the spirit or sacrificing the advantages thereof, and I therefore reserve the right to make such changes as fairly fall within the scope of my invention.

Having thus described my invention, what I claim as new, and desire to secure by Letters Patent, is—

A marker for planters, consisting of the inclosing shell or socket attached to the spoke of a ground-wheel of the planter, a marking-arm fitted in said socket and provided with one or more notches in its shank, and a flat spring-arm attached at one end to the external wall of the casing and provided with a projecting pin or stud, which is normally forced through a suitable aperture in the wall of the socket and into one of the notches or perforations in the shank or stem of the marker-arm, and with an integral handle at its free end, substantially as shown and described.

In testimony whereof I affix my signature in presence of two witnesses.

JACOB RINEARSON COX.

Witnesses:
 GEO. GOSS RYNERSON,
 JAMES PLANE.